July 31, 1962

A. FERRARI ETAL 3,046,834

MOTION PICTURE CAMERA

Filed July 31, 1959

Inventors
Alfredo Ferrari
Adolf James

July 31, 1962    A. FERRARI ETAL    3,046,834
MOTION PICTURE CAMERA
Filed July 31, 1959    2 Sheets—Sheet 2
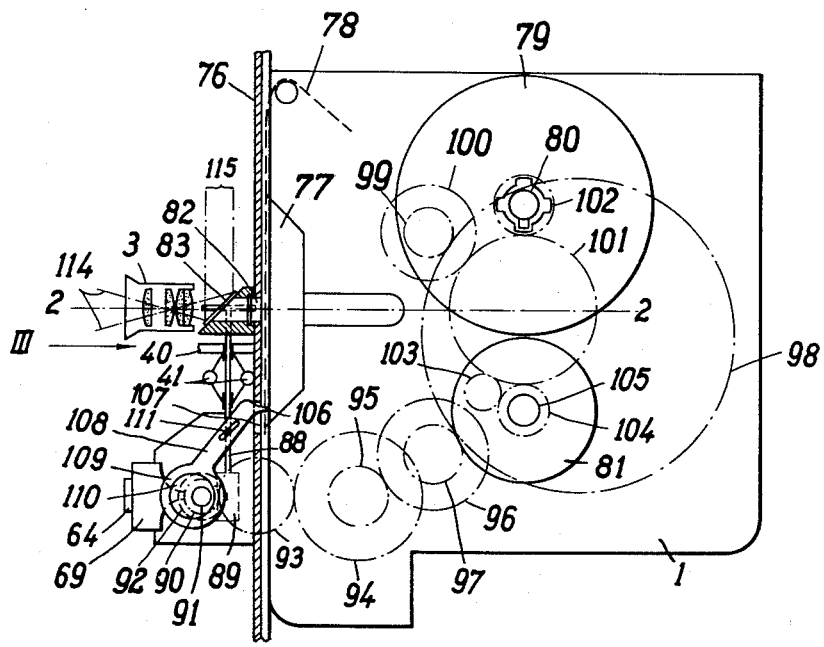
*Fig. 2*
*Fig. 3*
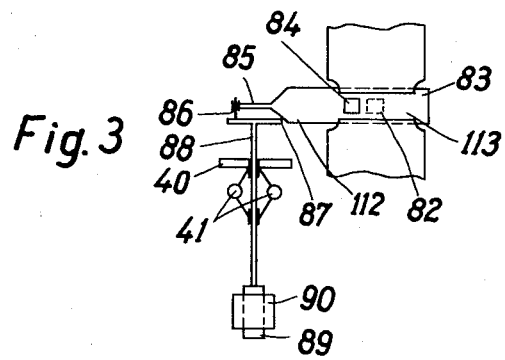
Inventors
Alfredo Ferrari

United States Patent Office 3,046,834
Patented July 31, 1962

3,046,834
MOTION PICTURE CAMERA
Alfredo Ferrari and Adolf Gasser, Mauren, Liechtenstein, assignors to Contina Bureaux und Rechenmaschinenfabrik, Aktiengesellschaft, Mauren, Liechtenstein
Filed July 31, 1959, Ser. No. 830,829
Claims priority, application Austria Aug. 6, 1958
8 Claims. (Cl. 88—18)

The present invention is based on the recognition of a requirement which occurs in connection with motion picture cameras and which has not been satisfied before owing to the absence of this recognition. For instance, when a horse moving at a slow gait (pace or trot) is photographed and the number of frames per unit of time, the so-called picture frequency of the camera, has been appropriately set, defined pictures will not be obtained when the horse begins a racing gallop, e.g., in order to jump over an obstacle. When it is attempted to adjust cameras of the previous constructions to higher picture frequencies and to readjust the lens diaphragm in accordance therewith the jump may have already been performed before the camera has been readjusted in this way. For this reason it is necessary to provide for a quick adjustment of the number of frames per unit of time similar to the high-speed winder of still cameras and to effect a corresponding readjustment of the lens diaphragm to the new exposure condition in order to be able to cope with such situations. Such cameras should also be capable of following the movement of an object being shot, although it is recommended not to use the camera in this way because strong changes in exposure conditions are inevitable in this case. E.g., when persons photographed in full sunlight move into the shadow of trees the aperture of the diaphragm will have to be increased in order to compensate for the resulting darkening of the object. It is known so to couple the exposure meter with the lens diaphragm that the diaphragm will be adjusted in accordance with the fluctuations in the exposure conditions when the indicator of the exposure meter is centered on a certain mark. Another solution resides in causing the incident light to fall on a photoelectric cell, which controls by means of an amplifier an electromagnet which carries diaphragm leaves so that the aperture of the diaphragm will be automatically adjusted to the prevailing light conditions. However, these semi- and fully automatic diaphragm adjusting means do not leave sufficient freedom for the operator particularly if he desires to achieve artistic effects by counterlight and shade shots, by the generation of light reflexes and shade contrasts and by the making of pictures which are intentionally blurred by diffused light etc. For this reason a wider requirement exists that the operator should be able to adjust the aperture of the diaphragm at his own discretion in order to produce certain picture effects without an adaptation of the aperture of the diaphragm to the prevailing light conditions i.e., without an automatic control of the aperture of the diaphragm by photoelectric cells or the like.

Finally the problem arises that it should be possible during the operation of the camera at one of the usual picture frequencies to reestablish the automatic dependency between picture frequency and diaphragm aperture because this will ensure the production of correctly, although not artistically exposed pictures, and to eliminate unusual picture frequencies and diaphragm apertures by an arbitrary action on these dependencies without need for a separate operation of the control means whereby these unusual picture frequencies and diaphragm apertures had been set.

Based on known motion picture cameras operable with various predetermined picture frequencies and with an automatic adaptation of the diaphragm aperture to the resulting exposure conditions, a camera of this type which is constructed according to the invention is characterized in that in addition to the above-mentioned devices for setting a predetermined picture frequency and for automatically adapting the aperture of the diaphragm to said picture frequency it comprises devices for a quick change of the number of frames per unit of time and for automatically adapting the diaphragm aperture to the thus changed exposure times independently of the setting of one of the predetermined picture frequencies. In this connection it is suitable so to design the device for a quick change of the picture frequency that the picture frequency is continuously variable so that the camera can be adapted to states of motion of the object which do not vary in proportion with the usual picture frequency stages. Nevertheless the provision of a ratchet mechanism may be desirable which indicates the usual predetermined picture frequency by a temporary resilient snap action within the range in which the picture frequency is continuously variable whereas it does not preclude an overriding of these predetermined picture frequencies.

In accordance with the further problem to enable an adjustment of the diaphragm independently of the predetermination thereof by the set picture frequency a development of the invention provides a device for effecting a quick adjustment of the diaphragm aperture independently of the setting of certain diaphragm apertures at the lens itself and independently of the automatic adjustment of the diaphragm aperture in dependence on the changes in the exposure time caused by the device for effecting a quick change of the picture frequency.

If a camera constructed according to the invention has in addition thereto a device which may be dependent on the release of the feed mechanism and which serves to bring the picture frequency and the diaphragm aperture into agreement with the setting of the device for a stagewise change of the picture frequency and for adjusting the aperture of the diaphragm in dependence on the picture frequency independently of the presetting of any picture frequency and independently of the presetting of the diaphragm aperture, further manipulations of the camera or its control means will not be required because the release of the feed mechanism will now automatically cause the set picture frequency and the diaphragm aperture coordinated with this picture frequency to be obtained. This is particularly desirable if a still picture had previously been made with a diaphragm aperture which was not consistent with the picture frequency which had been set and not used. For this reason the camera may be started after this still photograph by a single control manipulation to operate with the set picture frequency and with the diaphragm aperture coordinated therewith.

Further details and advantages of the invention will be explained with reference to an illustrative embodiment shown in the drawing, in which the essential parts of a camera constructed according to the invention are shown in perspective. For the sake of representation in a drawing, some parts are shown detached from the other elements rather than in their operative position. Another modification adopted for the sake of representation in a drawing will be stated in detail in the description of the drawing.

FIG. 2 is a vertical longitudinal sectional view of the essential parts of the camera with the lens, the film guide, the essential parts of the transmission and the film and supply and take-up reels.

FIG. 3 is a top plan view of the oar front parts of the transmission viewed in the direction of arrow III in FIG. 2.

Figure 1:
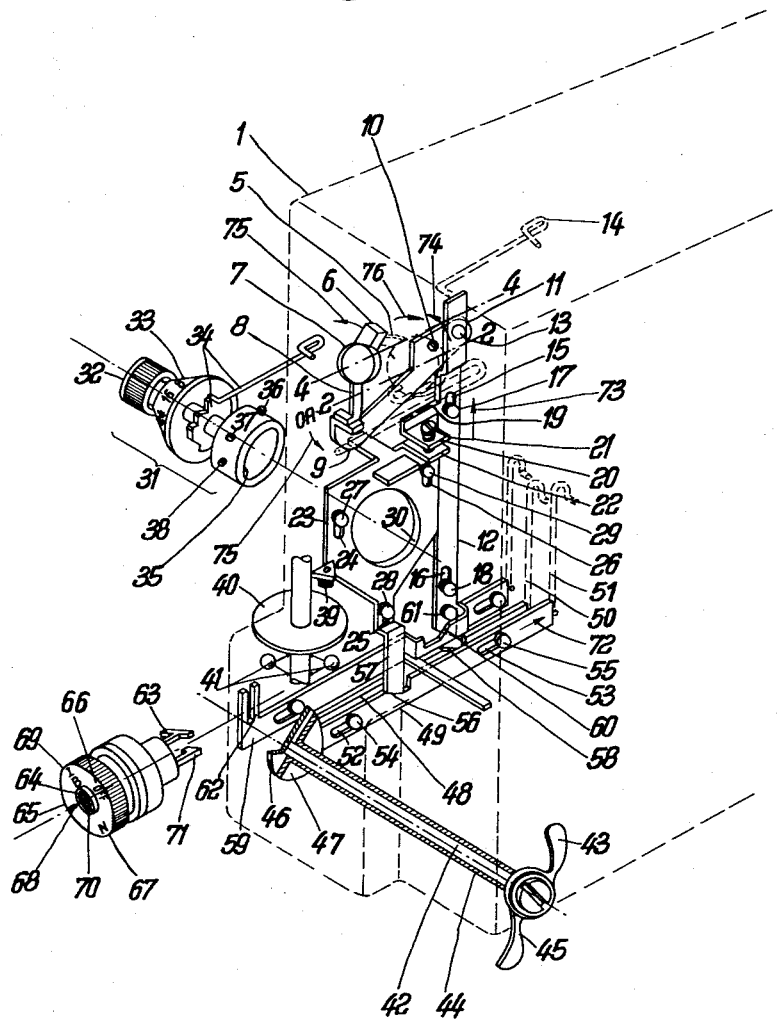
FIG. 1 shows the above-mentioned perspective view.

In the drawings, dash lines indicate the camera housing 1. The optical axes of one of the lenses 3 is shown, which are disposed in a revolving nosepiece rotatable about the axis 4—4. Like each of the other lenses the lens 3 carries a lens adjusting ring, the nose of which is designated 5. The nose 5 tends to revolve about the axis 2—2 in the clockwise sense. This would cause the adjustment of the largest diaphragm aperture unless this was prevented by the stop 6. This stop forms one arm of the double-armed lever 7, the other arm of which is designated 8. The lever 7 is rotatable about the axis 4—4. The arm 8 of the lever 7 is engaged by the arm 9 of a second double-armed lever, the fulcrum of which is designated 10 and the other arm 11 of which is pivotally connected at 13 to the vertical rail 12. A spring 14 tends constantly to urge the vertical rail 12, which will hereinafter be referred to as an adjusting member 12, in a downward direction. The adjusting member 12 is guided in a straight line by the longitudinal slots 15, 16 and the guide pins 17, 18. It has a lug 19, which merges into the guide lug 20 for the adjusting screw 21. The adjusting screw 21 engages the abutment lug 22 of the adjusting plate 23. The adjusting plate 23 has guide slots 24, 25 and 26, which receive the guide pins 27, 28 and 29 to ensure a straight-line vertical guidance of the adjusting plate 23. The adjusting plate has a circular aperture 30, through which the setting means 31 for the usual picture frequencies extends. For this purpose the setting means 31 consists of the setting knob 32, the scale 33 for indicating the set picture frequency, the ratchet mechanism 34 for retaining the set picture frequency and the drum 35, which has pins 36, 37, 38 etc. of different length. One of these pins 36–38 etc. lies below the abutment lug 22 of the adjusting plate 23 to set the latter to a certain level. As the adjusting plate 23 carries a brake pin 39, which determines the level of the brake disc 40 of the pendulum governor 41, one of the picture frequencies of the feed mechanism, not shown, of the camera can be set with the aid of the setting means 31, one of the pins 36–38 etc., its adjusting drum 35, the abutment lug 22, the adjusting plate 23 and the brake pin 39.

The following additional devices are provided according to the invention.

The shaft 42 is rotatably mounted in a suitable manner in the camera housing and is firmly connected to the adjusting means 43 disposed outside the camera body. This adjusting means will suitably consist of a thumb pressure lever. The shaft 42 serves for rotatably mounting the hollow shaft 44, which is firmly connected to the handle 45, which consists of a finger pull lever. The finger pull lever 45 lies also outside of the housing 1 of the camera. The shaft 42 carries the adjusting cam 46 and the hollow shaft 44 carries the adjusting cam 47. The active rim faces of the cams 46, 47 are in engagement with the end faces of the control rails 49, 48. Compression springs 50, 51 act on the opposite end faces. Both control rails have longitudinal slots 52, 53, which receive guide pins 54, 55 so that the control rails 48, 49 can move only along a straight line. The control rail 49 has an oblique surface 56 engaged by a correspondingly oblique end face of an extension 57 of the adjusting plate 23. This means that a finger pull exerted in the counter-clockwise sense on the finger pull lever 45 will cause the extension 57 and with it the adjusting plate 23 to be lifted. This movement is transmitted by means of the abutment lug 22, adjusting screw 21 and lug 20 to the vertical rail 12 so that the double-armed lever 9, 10, 11 performs a movement in the counterclockwise sense as indicated by arrow 74. As a result the double-armed lever 6, 7, 8 rotates also in a counterclockwise direction indicated by arrow 75 so that the nose 5 of the diaphragm adjusting ring, which is under the action of an energy storage means, such as a spring, not shown, performs a clockwise rotation 76, which causes an automatic increase of the diaphragm aperture. At the same time the adjusting plate 23 has lifted the brake pin 39 entirely independent of the initial position imparted to the adjusting plate 23 by means of one of the pins 36–38 etc., i.e. entirely independent of the picture frequency by the setting knob 32.

The adjusting cam 46, which is under the action of the thumb pressure lever 43 acts on the control rail 48, which has also an oblique cam face at 58. This oblique cam face cooperates with the lower end face of the adjusting member 12 consisting of a vertical rail. At this point the drawing has been modified to illustrate what has been said. In the actual construction the vertical rail 12 is somewhat extended downwardly and cranked around the third control rail 59 so that its oblique end face can cooperate with the oblique face 58 of the second control rail 49.

The third control rail 59 has an oblique face 60 which extends oppositely to the direction of the oblique faces 56 and 58. The top edge of the control rail 59 is engaged by the cam 61 of the vertical rail 12. The third control rail 59 ends in a fork 62, which receives the T-shaped extension 63 of the release button 64, which is displaceable relative to the setting knob 65. The setting knob 65 can be set to different positions, in which either the entire feed mechanism of the camera is inoperative (see position 66), or in which the feed mechanism serves for shooting motion pictures (position 67) whereas the release 64 must be pressed to maintain the feed mechanism in operation, or in which a continuous operation of the feed mechanism is possible (position 68) without need for pressing the release button 64 so that a self-photograph can be made in this position, or in which stills can be made (position 69). In order to enable exposure times which are independent of the feed mechanism of the camera the release button 64 has a tapped opening 70, in which a cable release can be inserted with which exposures of any length can be effected. The devices which respond to the position 66–69 of the setting knob 65 are not shown because they are the subject matter of my co-pending U.S. application Serial Number 838,758 with the title: "Transmission Control for Motion Picture Cameras" filed September 8, 1959, claiming the priority of the Austrian application 58,981V filed September 13, 1958.

The device 34, which consists of a resilient ratchet mechanism indicating the picture frequency set by turning the knob 32 may be connected to the levers 43 and 45 in order to indicate also which predetermined picture frequency and diaphragm aperture associated therewith has been set by a rotation of these levers 43, 45 so that the operator of the camera can estimate the picture frequency and diaphragm aperture just set by the levers 43 and 45 without reference to scales.

The mode of operation of the arrangement shown is as follows:

The desired picture frequencies are set as usual by the setting means 31. Before or after this the setting knob 65 is brought into a position in which either normal shots (position 67) or continuous shots (position 68) are made, whereas the settting means 31 need not be operated before or after a setting 69 for stills. In position 67 the release button 64 is pressed to start the feed mechanism of the camera. The brake disc 40 of the pendulum governor 41 then assumes the level corresponding to the predetermined set picture frequency in dependence on the level of the brake shoe 39.

If it is desired to depart from this picture frequency during the operation of the feed mechanism it is sufficient to pull the finger pull lever 45. This will rotate the hollow shaft 44 and this movement will be transmitted to the adjusting cam 47, which will displace the control rail 49 against the action of the spring 51 to the right in the direction of arrow 72. This will cause the oblique face 56 to lift the extension 57 of the adjusting plate 23. As a result the abutment lug 22 of the adjusting plate leaves the level imparted to it by one of the pins 36–38 etc. and the brake pin 39 is lifted in accordance therewith. This means that the brake disc 40 of the pendulum governor 41 can lift, whereby the speed of the feed mechanism is increased until this increase corresponds to the new position of the brake pin 39. The upward movement of the adjusting plate 23 in the direction of arrow 73 is transmitted by the adjusting screw 21 to the drive lug 20 of the adjusting member 12 consisting of a vertical rail. This causes the double-armed lever 9, 10, 11 to swing about the fulcrum in the counterclockwise sense indicated by arrow 74 so that the arm 9 is lowered. This causes the double-armed lever 6, 7, 8 to rotate also in the counterclockwise direction indicated by arrow 75 so that the arm 6 is somewhat spaced from the nose 5 of the lens diaphragm adjusting ring 3, the part 5, 3 forming a diaphragm adjusting means for adjusting the aperture of the diaphragm of the camera. Thereby the diaphragm adjusting ring is rotated by the unillustrated spring in the direction of arrow 76 to increase the diaphragm aperture. For equal exposure conditions the increase of the diaphragm aperture is consistent with the fact that shorter exposure times have been set by the increase of the picture frequency.

To change the diaphragm aperture independently of the manual adjustment of this lens diaphragm by means of the lever 5 and independently of the picture frequency set by the finger pull lever 45, e.g., because the object remaining in its state of motion has entered a shadow area, it is sufficient to press the thumb pressure lever 43 in order to effect this increase of the lens diaphragm opening by means of the shaft 42, the adjusting cam 46, the second control rail 48, its oblique cam face 58 and the oblique lower end face of the adjusting member 12. This increase of the lens diaphragm aperture is effected in the same manner as the automatic increase of the diaphragm aperture in the case of a change of the picture frequency by the finger pull lever 45.

When a predetermined setting of the lens diaphragm had been effected by a movement of the setting knob 65 to the still position 69, all parts must be returned to the position which corresponds to the set picture frequency and the position of levers 43, 45 before shooting a motion picture. This return will be automatically effected when the release button 64 is pressed because this movement will be transmitted by the extensions 63 and 71 and the fork 62 to the third control rail 59. This causes the cam 61 to slide off the upper edge of the rail 59 and reach the oblique face 60 so that the adjusting rail 12 under the influence of its own weight and of the pressure spring 14 performs a downward movement whereby the adjusting screw 21 is caused to engage the lug 22 of the adjusting plate 23. Under the action of springs 50, 51 the levers 43, 45 return to their initial position so that the position of rail 59 and the picture frequency setting of setting means 31 and the diaphragm aperture associated with this picture frequency are again controlling.

Films made in cameras according to the invention are usually shown at a uniform projection speed so that those shots which were made at a temporarily increased shooting speed would appear as so-called time-lapse photos. This may be desirable or undesirable. In the latter case it is suitable to cause a device, not shown, which is dependent on the finger pull lever, to produce a mark on the film, e.g., in the form of a cut curve. This cut curve is scanned in the projector by a feeler, which controls the speed of the projector in the same way in which the feed mechanism of the camera had been operated. E.g., when the finger pull lever of the camera had been operated to gradually increase the shooting speed of the camera to a maximum the cut curve will adjust the projector to a corresponding speed which gradually increases to a maximum.

It is not necessary to cut the curve mechanically. A part of the incident light could be branched off and used for marking a light trace which is scanned in the projector by an optical line and used for controlling the projection speed.

FIG. 2 shows the above-mentioned housing 1 of the camera with the lens 3, the optical axis 2—2 of the lens, the film guide 76, the film pressure plate 77 and the film 78 itself. The film is disposed on the supply reel 79, which is held and driven at 80. The exposed film is guided to the take-up reel 81. To enable an exposure of the film through the lens 3 the film guide 76 has an exposing aperture 82. In front of this aperture the shutter 83 is disposed (see also FIG. 3), which consists in the present case of a mirror carrier provided with a passage opening 84 for the light to which the film is to be exposed. The mirror carrier 83 performs a reciprocating movement effected by the connecting rod 85, which is connected to the crank 86 of the crank disc 87 carried by the shaft 88. The shaft 88 carries the brake disc 40, which is shown in FIG. 1 and which acts on the weights 41 of the pendulum governor. The shaft 88 is driven by a pair of helical gears 89, 90. The helical gear 90 is carried by the shaft 91, which carries also the gear wheel 92 in mesh with the gear wheel 93, which is driven by the gear wheel 94, the shaft of which carries the gear wheel 95, which is in mesh with the gear wheel 96. The shaft of gear wheel 96 carries the gear wheel 97 which is in mesh with the large gear wheel 98. This gear wheel is driven by a pinion, not shown. The pinion is driven by a motor. This motor will in cases be spring-driven but may also consist of an electric motor. The same wheel 98 serves for driving the reels 79, 81. For this purpose the gear wheel 98 is in mesh with the gear wheel 99, the shaft of which carries the gear wheel 100. The gear wheel 100 is in mesh with the gear wheel 101 and the latter carries the gear wheel 102 provided with the hub 80 carrying the supply reel 79. The gear wheel 101 is further in mesh with the gear wheel 103, which meshes with the gear wheel 104 driving the carrying hub 105.

The film 78 is fed by the claw 106 which engages the perforation 107 of the film 78. The claw 106 is formed by the one-armed lever 108, which has an annular portion 109. The ring 109 surrounds the eccentric disc 110 also carried by the shaft 91. A straight guide 111 causes the claw 106 to move along an approximately rectangular path so that the claw 106 when moving on the short side of the rectangle penetrates the perforation 107 while the movement along the longer side of the rectangle serves to feed the film. On the other short side of the rectangle the claw 106 leaves the perforation 107 and on the other long side of the rectangle the claw 106 performs its return movement.

As has already been stated the reciprocating mirror carrier 83 has mirror surfaces 112 and 113, which will be disposed in the path of rays 114 of the lens 3 when the apertures 82 and 84 are not in registry. This means that the path of rays 114 of the lens 3 is deflected to form the beam of rays 115. In the path of rays 115 a reflex viewfinder is disposed, in which the object being photographed can be continuously observed.

What is claimed is:

1. In a motion picture camera, in combination, governor means; manually operable speed selecting means for selecting the number of frames to be exposed each second; speed control means actuated by said selecting means and cooperating with said governor means for setting the latter to operate the camera at the speed selected with said selecting means; diaphragm adjusting means; motion transmitting means operatively connected to said speed control means and cooperating with said diaphragm adjusting means for setting the latter to provide an aperture which harmonizes with the speed selected by said selecting means; and manually operable means cooperating with said speed control means for moving the latter at the will of the operator independently of the selected speed of said selecting means so that the operator can manually provide a variation in the speed of operation of the camera.

2. In a camera as recited in claim 1, said selecting means providing a stepwise selection of speeds and said manually operable means providing a stepless speed variation.

3. In a camera as recited in claim 1, second manually operable means cooperating with said diaphragm adjusting means independently of said speed control means for adjusting said diaphragm to a size which does not harmonize with the speed of said selecting means.

4. In a camera as recited in claim 3, said second manually operable means acting through said motion transmitting means on said diaphragm adjusting means and actuating said motion transmitting means independently of said speed control means.

5. In a motion picture camera, in combination, a rotary governor having an axis of rotation and including a brake disc which moves along said axis as the speed of rotation of said governor changes; a speed control member; support means supporting said speed control member for movement parallel to said axis; a brake member carried by said speed control member and located in the path of movement of said disc along said axis so that when said brake member engages said disc the speed of said governor will be determined by the position of said disc along said axis; spring means cooperating with said speed control member for urging the latter in a direction which moves said brake member toward said disc; a projection carried by said speed control member for movement therewith; a rotary, manually turnable speed selecting member having a plurality of stop members of different lengths capable of being selectively placed in the path of movement of said projection according to the selection of the operator for determining the position of said speed control member and thus of said brake member so as to determine the operating speed of said governor; and manually operable means cooperating with said speed control member for moving the latter in opposition to said spring means independently of setting of said selecting member for quickly changing the speed of the camera during operation thereof.

6. In a camera as recited in claim 5, said manually operable means including a second projection of said speed control member and a manually shiftable member having an inclined surface against which an end of said second projection is urged by said spring means so that said manually operable means provides a stepless speed adjustment.

7. In a camera as recited in claim 6, diaphragm adjusting means, motion transmitting means engaging said speed control member for movement therewith and cooperating with said diaphragm adjusting means for actuating the latter when said speed control member moves, said spring means urging said motion transmitting means against said speed control member to act through said motion transmitting means on said speed control member, so that when said manually operable means moves said speed control member the diaphragm adjusting means also is actuated.

8. In a camera as recited in claim 7, second manually operable means cooperating with said motion transmitting means independently of said speed control member for providing a diaphragm adjustment which is not determined by the position of said speed control member.

References Cited in the file of this patent

UNITED STATES PATENTS

| | | |
|---|---|---|
| 1,897,762 | Morsbach | Feb. 14, 1933 |
| 1,898,675 | Lowkrautz | Feb. 21, 1933 |
| 1,935,327 | Morsbach et al. | Nov. 14, 1933 |
| 2,333,772 | Eaton | Nov. 9, 1943 |
| 2,653,507 | Riles et al. | Sept. 29, 1953 |